UNITED STATES PATENT OFFICE.

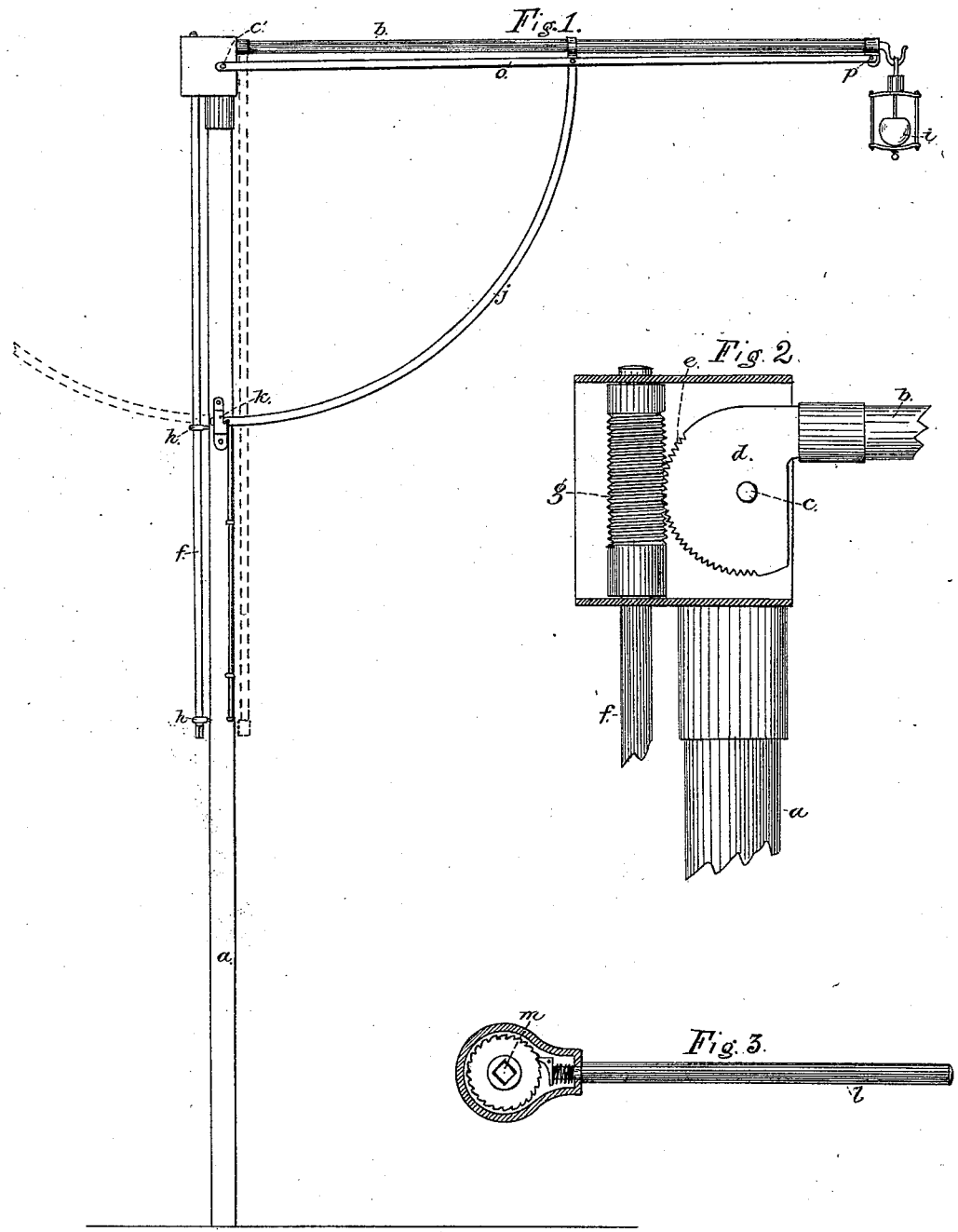

AUGUSTUS G. SCHLOTTERBECK, OF PORTLAND, MAINE.

SUPPORT FOR ELECTRIC LIGHTS.

SPECIFICATION forming part of Letters Patent No. 362,399, dated May 3, 1887.

Application filed October 28, 1886. Serial No. 217,488. (No model.)

*To all whom it may concern:*

Be it known that I, AUGUSTUS G. SCHLOTTERBECK, of Portland, in the county of Cumberland and State of Maine, have invented certain new and useful Improvements in Supports for Electric Lights; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a side elevation of my invention.
Fig. 2 is a side view with parts broken out. Fig. 3 is a plan view of the lever, with its ratchet and pawl, to operate the device seen in Fig. 1, with parts removed to exhibit the ratchet and pawl.
Same letters show like parts.

My invention relates to electric-light arms for the support of electric lights.

The especial object of this invention is to provide a support for electric lights, and one that at the same time will allow the light to be elevated to a proper position for illuminating purposes and lowered for replenishing, trimming, and adjusting. The desirable thing is to have an electric light so suspended that it can be hung over a street, over or nearly over the center thereof, and still so arranged that it can be taken down easily and readily for the purposes above named.

$a$ shows a post to be set (when the light is suspended out-of-doors) in the ground. Suppose that the light is to be hung over a street. Then, with my invention, the post $a$ may be set at the edge of the street or on the outer edge of the sidewalk. At the top of this post $a$, extending horizontally, is the arm $b$. This arm is pivoted at the top of the post $a$ into or on said post, and the arm $b$ is capable of swinging upwardly and downwardly in a vertical plane on said pivot. This pivot is seen at $c$.
The arm $b$, where it is pivoted to the said post $a$, has a semicircular head or plate, $d$. This head or plate has on a part of the circumference the teeth $e$.

Extending up on the post $a$ is a rod, $f$. This rod has on its upper end the screw-thread $g$. This rod runs through proper eyes or holders $h$ on the post $a$, and is held in proper bearings at the top of the post $a$, that will be in detail hereinafter described. The screw-thread $g$ fits into the teeth $e$ of the head or plate $d$. Thus by the revolution of the screw-thread $g$ the head or plate $d$ is made to turn on the pivot $c$ accordingly as the screw-thread is turned. As the head or plate $d$ revolves, so the arm $b$ moves upwardly or downwardly.

The rod $f$ extends down near enough to the ground so that it can be operated by a person standing on the ground. Thus by turning the rod $f$ the arm $b$ can be raised up to the position seen in Fig. 1, or dropped down to the position indicated by the dotted lines in the same figure.

$i$ shows the electric light attached to the outer end of the arm $b$.

The toothed head or plate $d$ and the screw-thread $g$ may be inclosed in a box, (seen in Fig. 2,) if desired. Then the rod $f$ and the screw-thread $g$ will have their bearings in the bottom and top of the box, as herein shown. $j$ is a brace to aid in supporting the arm $b$ when raised to a horizontal position, as seen in Fig. 1. It is made to catch in a holder, $k$, when the arm $b$ is up horizontal. It can be thrown out of the catch $k$ by a pole or other means when it is desired to lower the arm $b$. The brace $j$ may be made in various forms. It may be straight and catch into a toothed rack set in a groove on the post $a$. Then, when the arm $b$ is lowered, the rack may be allowed to slide downwardly as the arm $b$ drops down to the vertical position seen in Fig. 1, or the brace may be thrown out of the teeth of the rack and the rack remain stationary.

Another form of a brace is one like a chaise-top brace. This is pivoted at one end to the arm $b$ and at the other to the post $a$. It has a joint at the center, and is rigid when the brace is straight. Then, when the arm is to be lowered, the center joint is bent inwardly and folds up as the arm $b$ descends.

To revolve the rod $f$ and turn the screw-thread $g$, I have devised the lever $l$. This lever is seen in plan in Fig. 3. It has a hollow head, in which is a ratchet and pawl. The ratchet has a hole, $m$, to fit the square end of the rod $f$. As the handle $n$ is swung the ratchet carries around the pawl, and so turns the rod $f$. By reversing the lever so that the other face is upward the swinging of it will turn the rod $f$ in the opposite direction. Thus the lever can be handily employed to turn the rod $f$ either way desired, and so to raise or lower the arm $b$. $o$ $o$ are lateral braces to strengthen the arm $b$ and prevent lateral swinging. These are attached to the arm $b$ at $p$ and to the post $a$ at the pivot $c$. In order that they may give firmness to the arm $b$, they should diverge as they approach the post $a$. With that view the pivot $c$ may be sufficiently long to separate the braces enough at that point.

What I claim as my invention, and desire to secure by Letters Patent, is—

The pivoted arm $b$, having the electric light, as set forth, the head or plate $d$, the rod $f$, with a screw-thread thereon to work in the teeth $e$ of the plate $d$, all in combination with the brace $j$, as and for the purposes herein set forth.

In testimony that I claim the foregoing as my own I affix my signature in presence of two witnesses.

AUG. G. SCHLOTTERBECK.

Witnesses:
CHARLES S. COOK,
CHARLES S. WOODBURY.